July 31, 1956  C. E. RYDEN  2,757,002
FISH KNOCKER
Filed June 20, 1955

INVENTOR.
Carl Edwin Ryden
BY
Cook + Robinson
ATTORNEYS

United States Patent Office 2,757,002
Patented July 31, 1956

2,757,002

FISH KNOCKER

Carl Edwin Ryden, Seattle, Wash.

Application June 20, 1955, Serial No. 516,591

2 Claims. (Cl. 273—67)

This invention relates to what are known by fishermen as "fish knockers," and has reference more specifically to improvements in devices of that kind which are in the nature of a club designed to be used for striking and stunning a large fish after it has been caught and landed in a boat; devices of this kind being practically a necessity when salmon or other large fish are caught on a hook, and where it is not uncommon to hook fish of from twenty to forty pounds in weight. Large fish can be considerably damaged and bruised after being landed merely by their flipping and thrashing about, and it is a common practise for salmon fishermen to carry with them small clubs or other instruments for striking the caught fish on the head to stun and thus keep them from bruising or otherwise detrimentally damaging themselves.

It is the principal object of the present invention to provide a fish knocker that can be collapsed from its extended length to a much shortened length that makes it possible for it to be easily contained in the ordinary tackle box. More specifically, the invention has for its object to provide a fish knocker that is formed from a plurality of telescopically assembled tubular sections, adapted to be extended to the usual, or a suitable club length to serve the intended purpose, and to be telescoped when not needed for use, to that substantially shortened length that makes it possible to dispose it in the coat pocket or to be contained in the usual type of tackle box.

Further objects and advantages of the present invention reside in the details of construction and combination of the telescopic parts comprising the device, as will hereinafter be fully described, including the provision of means for frictionally retaining the telescopic parts of the device in their extended, or in their collapsed relationship.

In accomplishing the above mentioned and other objects of my invention, I have provided the improved details of construction, the preferred forms of which are illustrated in the accompanying drawings, wherein.

Figure 1:
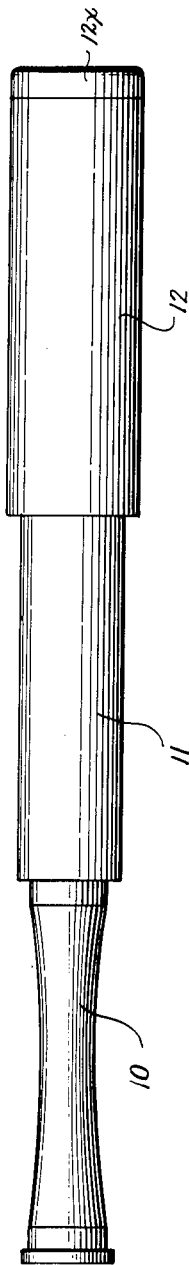
Fig. 1 is a side view of the present fish knocker with its telescopically assembled parts extended, as for use.

Referring more in detail to the drawings:

In its present preferred form of construction, the fish knocker of this invention comprises three telescopically assembled, tubular sections, herein designated, respectively, as the handle section 10, the intermediate or middle section 11 and the outer or head section 12. The overall length of the device, when fully extended for use, as shown in Fig. 1, is approximately eighteen inches. However, it might be more or less, and might comprise more sections. When telescoped or collapsed, the device is approximately eight inches long and can easily be contained in the ordinary type of tackle box which is from ten to twelve inches long.

The various sections of the present knocker are tubular and round in cross-section. Preferably but not necessarily, they are made of aluminum. The outer, or head end section 12 of the device is the greatest in diameter. It is closed at its outer end by a head or plug 12x which has a shank 12s of reduced diameter that is threaded into the outer end of the tubular body portion of the section to secure and to tighten the head against the end of the body. The head 12x might, if desired, be of a heavy metal, such as iron or lead, and made of such length as to give it the desired or required weight for the most effective use of the knocker.

For a better understanding of proportionate sizes of parts, it will here be stated that the outer section 12 of a knocker eighteen inches long would be approximately two inches in diameter. The inner section, or handle portion 10 would be about one inch in diameter at its ends, and preferably of reduced diameter between its ends, to make it more easily grasped by the hand and held for use.

Figure 2:
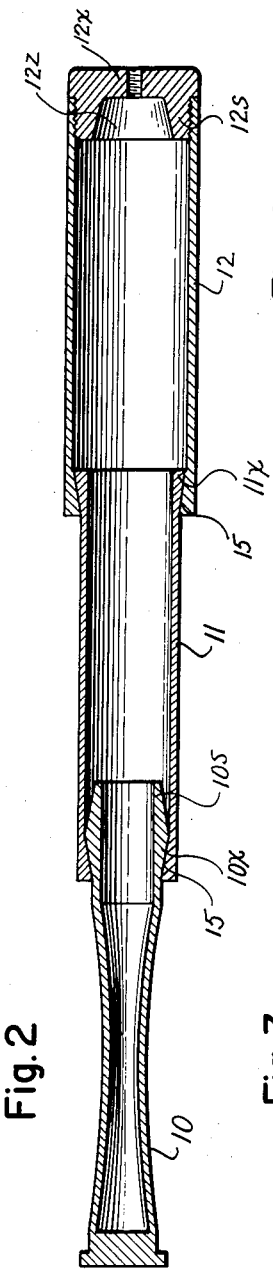
Fig. 2 is a sectional view of the device, taken in the axial plane of its telescopic sections, as extended.
Figure 4:
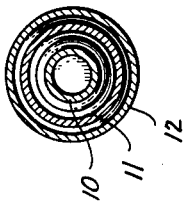
Fig. 4 is a cross section taken on the line 4—4 in Fig. 2.
Figure 3:
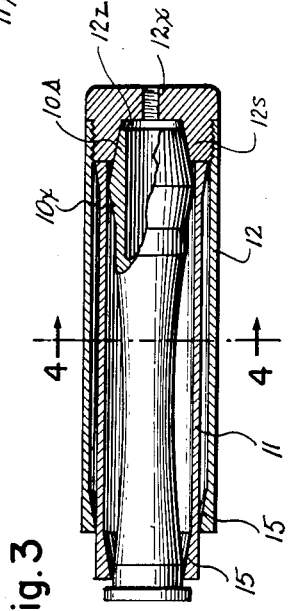
Fig. 3 is a sectional view of the device, showing the assembled sections as telescoped together.

To definitely limit the extension of the telescopically assembled sections 10, 11 and 12 relative to each other, the handle section 10 and the intermediate section 11 which are generally cylindrical in form, are conically flared at their inner ends, as at 10x, and 11x, respectively. Formed within those end portions of the intermediate and outer sections 11 and 12, through which the next smaller sections are telescopically movable, are conically sloping abutments or shoulders 15 against which the flared ends 10x and 11x of parts 10 and 11 are adapted to engage with frictional holding effect when the parts are extended, to give the extended knocker the desired and required rigidity. The inner end portion of the section 10 terminates in a conically tapered portion 10s, as best shown in Fig. 2. When the three sections of the devices are fully telescoped together as in Fig. 3, the tapered inner end portion of section 10 will be received by and will fit tightly in a conically tapered socket 12z formed in the inner end of the shank portion of the head 12x, thus to frictionally hold the parts in their collapsed or telescoped condition until manually pulled apart.

The shoulder portions 15 as formed within the sections 11 and 12 may be integral with the tubular members in which they are located, or they might be separately formed and press fitted therein.

With the device so constructed, the three sections 10, 11 and 12, can be easily and quickly drawn out to extended relationship, as in Fig. 2, thus to provide a club which is quite effective for striking and stunning a hooked fish. When these parts are collapsed, or telescoped together, as in Fig. 3, the device is of such shortened length as to make it easily carried in the pocket or easily received in the ordinary tackle box.

It is not the intent to limit the device to any specific length or diameter or number of sections. Nor is it desired to confine its manufacture to any particular material. However, it is desirable that it be light in weight, except for the head portion 12x, and this can be made of such weight as to make the device most effective in use. Non-rusting metal is most practical for its manufacture.

Having thus described my invention, what I claim as new therein and desire to secure by Letters Patent is:

1. A fish knocker comprising a plurality of telescopically assembled sections, adapted to be drawn out from telescoped relationship to extended relationship to provide a device of club-like form, each of said sections, with the exception of the outermost one, terminating at its outer end in a portion with a slight conical flare that is slidably fitted within the enclosing section; and each of said sections, with the exception of the inner-most one formed within its inner end portion with an internal, conically tapered seat against which the flared outer end portion of the contained section is adapted to engage upon drawing the sections to their extended relationship, said innermost section being conically tapered at its inner end and the outer end of the outermost section having a weighted head piece fitted therein which is formed with an internal, conically tapered socket, coaxially of the section and designed to receive and frictionally hold said tapered inner end of the inner section therein when said sections are fully telescoped together.

2. A fish knocker comprising a plurality of telescopically assembled sections adapted to be drawn out from telescoped relationship to extended relationship to provide an article of club-like form; the innermost of said telescoped sections being designed, when said sections are fully extended, to serve as the club handle, and the outermost of said sections having a solid, weighted head piece applied to its outer end; each of said sections, with the exception of the outermost one, terminating at its outer end in a portion with a slight conical flare that is slidably fitted within the enclosing section; each section, with the exception of the innermost one, having its inner end portion formed with an internal conically tapered seat against which the flared outer end portion of the contained section is adapted to be engaged upon drawing the sections to their extended relationship, in a friction tight joint that gives rigidity to the knocker; said innermost section terminating at its inner end in a slight conical taper, and said weighted head piece being formed with a conically tapered socket designed to receive and frictionally hold said tapered terminal portion of the inner section therein when said sections of the knocker are fully telescoped together.

References Cited in the file of this patent

UNITED STATES PATENTS

| 386,078 | McCormick | July 10, 1888 |
| 632,064 | Roberts | Aug. 29, 1899 |

FOREIGN PATENTS

| 16,565 | Great Britain | July 25, 1902 |